United States Patent
Sugiura

(10) Patent No.: US 12,472,781 B2
(45) Date of Patent: Nov. 18, 2025

(54) HEAVY DUTY TIRE

(71) Applicant: Sumitomo Rubber Industries, Ltd., Kobe (JP)

(72) Inventor: Takashi Sugiura, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 28 days.

(21) Appl. No.: 18/373,287

(22) Filed: Sep. 27, 2023

(65) Prior Publication Data

US 2024/0100887 A1 Mar. 28, 2024

(30) Foreign Application Priority Data

Sep. 28, 2022 (JP) ................. 2022-155362

(51) Int. Cl.
*B60C 11/12* (2006.01)
*B60C 11/11* (2006.01)
*B60C 11/13* (2006.01)
*B60C 11/03* (2006.01)

(52) U.S. Cl.
CPC ...... *B60C 11/1369* (2013.01); *B60C 11/1218* (2013.01); *B60C 11/1259* (2013.01); *B60C 2011/0346* (2013.01); *B60C 2011/0355* (2013.01); *B60C 2011/0365* (2013.01); *B60C 2011/0367* (2013.01); *B60C 2011/1213* (2013.01); *B60C 2011/1268* (2013.01); *B60C 2200/06* (2013.01)

(58) Field of Classification Search
CPC ............ B60C 11/1369; B60C 11/1218; B60C 11/1259; B60C 2011/1268
See application file for complete search history.

(56) References Cited

U.S. PATENT DOCUMENTS

| 2,186,180 | A | * | 1/1940 | Sloman | ................ | B60C 11/12 |
| | | | | | | 152/DIG. 3 |
| 6,761,197 | B2 | * | 7/2004 | Carra | ................... | B60C 11/11 |
| | | | | | | 152/209.27 |
| 2011/0226397 | A1 | * | 9/2011 | Hamada | ................ | B60C 11/11 |
| | | | | | | 152/209.18 |
| 2014/0158261 | A1 | * | 6/2014 | Takahashi | .......... | B60C 11/0306 |
| | | | | | | 152/209.1 |
| 2017/0106701 | A1 | * | 4/2017 | Ito | ....................... | B60C 11/0304 |
| 2018/0134093 | A1 | * | 5/2018 | Maehara | ................ | B60C 11/12 |
| 2018/0222255 | A1 | * | 8/2018 | Maehara | ............ | B29D 30/0606 |
| 2019/0176528 | A1 | | 6/2019 | Ito | | |

FOREIGN PATENT DOCUMENTS

JP 2019-104411 A 6/2019

* cited by examiner

Primary Examiner — Robert C Dye
(74) Attorney, Agent, or Firm — XSENSUS LLP

(57) ABSTRACT

A heavy duty tire can have a tread portion that includes a plurality of circumferential grooves that zigzag, a plurality of lateral grooves connecting between zigzag vertexes of the circumferential grooves, and a plurality of hexagonal blocks formed by the circumferential grooves and the lateral grooves. A groove depth of the circumferential groove can be 21 mm or more. Each of the hexagonal blocks can include a three-dimensional sipe extending across the hexagonal block. The lateral groove can include a raised portion formed by raising a groove bottom of the lateral groove to connect between the hexagonal blocks adjacent to each other in the tire circumferential direction.

18 Claims, 8 Drawing Sheets

HEAVY DUTY TIRE

CROSS-REFERENCE TO RELATED APPLICATION

The present application claims priority to Japanese patent application JP2022-155362, filed on Sep. 28, 2022, the entire contents of which are incorporated herein by reference in its entirety.

BACKGROUND

Technical Field

The present disclosure relates to a heavy duty tire.

Background Art

Japanese Laid-Open Patent Publication No. 2019-104411 discloses a tire having hexagonal blocks in a tread portion. In the hexagonal block, a three-dimensional sipe is disposed.

In recent years, a heavy duty tire has been required to be, for example, a long-life tire that allows 600000 to 700000 km of running. In such a tire, a circumferential groove disposed in a tread portion may need to have a large groove depth. However, in a tire having a large groove depth, a pattern stiffness of the tread portion may be reduced, and uneven wear resistance is likely to be reduced.

SUMMARY

The present disclosure is directed to a heavy duty tire including a tread portion. The tread portion can include a plurality of circumferential grooves zigzagging in a tire circumferential direction so as to form zigzag vertexes, a plurality of lateral grooves connecting between the zigzag vertexes of the circumferential grooves adjacent to each other in a tire axial direction, and a plurality of hexagonal blocks formed by the circumferential grooves adjacent to each other in the tire axial direction and the plurality of lateral grooves. The plurality of circumferential grooves can each have a groove depth of 21 mm or more. Each of the plurality of hexagonal blocks can include a three-dimensional sipe zigzagging in the tire axial direction and a tire radial direction and extending across the corresponding hexagonal block. Each of the plurality of lateral grooves can include a raised portion formed by raising a groove bottom of the corresponding lateral groove to connect between the hexagonal blocks adjacent to each other in the tire circumferential direction.

DETAILED DESCRIPTION

The present disclosure has been made in view of the aforementioned circumstances in the Background section, and an object of the present disclosure, among one or more objects, can be to provide a heavy duty tire that allows enhancement of life performance and uneven wear resistance.

One embodiment of the present disclosure will be described below with reference to the drawings.

Figure 1:
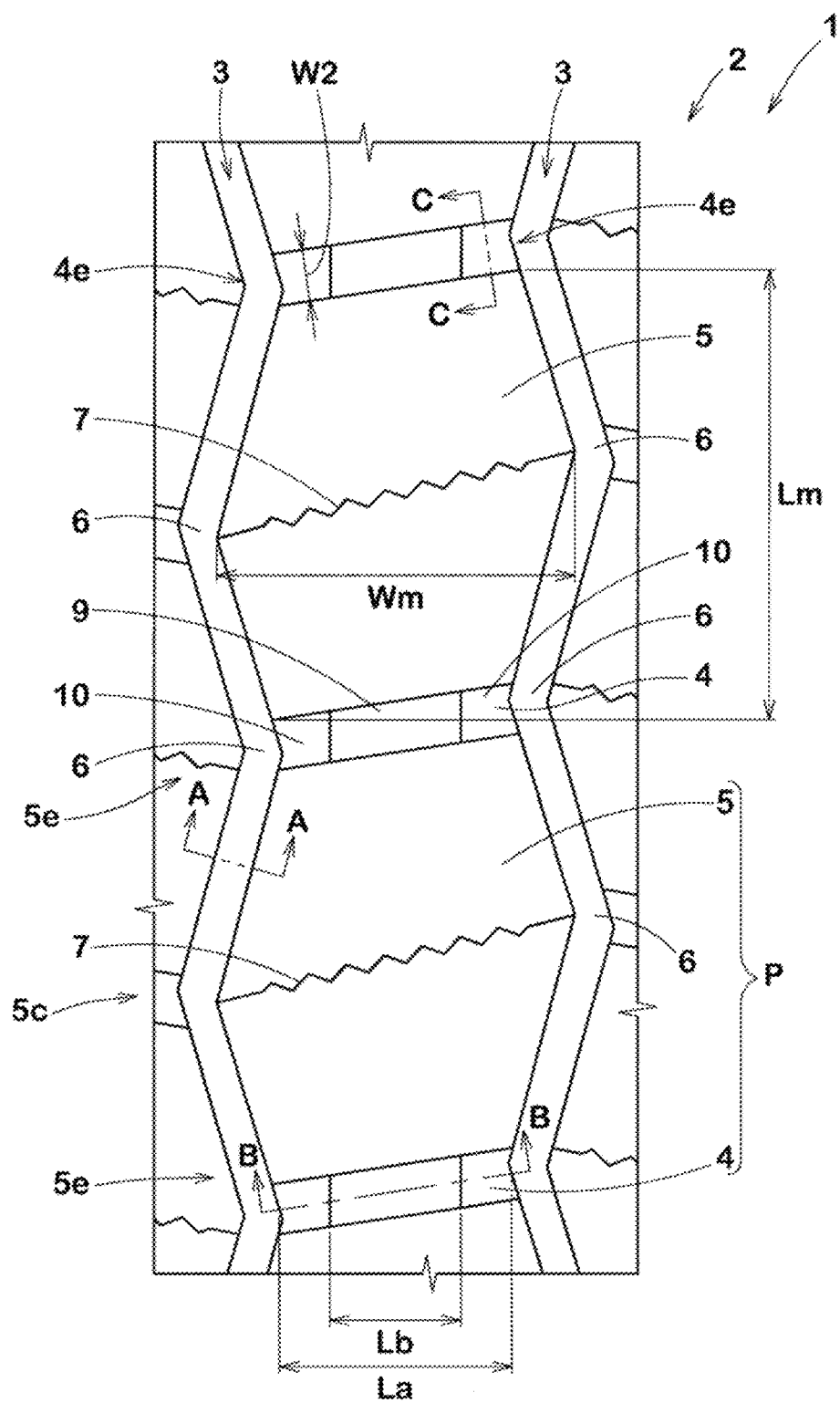
FIG. 1 is an enlarged plan view of a tread portion of a heavy duty tire according to one embodiment of the present disclosure.

FIG. 1 is an enlarged plan view of a tread portion 2 of a heavy duty tire (hereinafter, may be simply referred to as "tire") 1 of the present embodiment. For example, the tire 1 of the present embodiment can be suitably used as a long-life tire that allows 600000 to 700000 km of running.

As shown in FIG. 1, in the present embodiment, the tread portion 2 can include a plurality of circumferential grooves 3, a plurality of lateral grooves 4, and a plurality of hexagonal blocks 5. Each circumferential groove 3 can zigzag in the tire circumferential direction so as to form zigzag vertexes 6. In the present embodiment, the circumferential groove 3 can extend continuously in the tire circumferential direction. In the present embodiment, the zigzag vertex 6 can refer to a bent portion that is bent in a different direction relative to the tire circumferential direction. Each lateral groove 4 can connect between the zigzag vertexes 6 of the circumferential grooves 3 adjacent to each other in the tire axial direction. For example, the lateral groove 4 can linearly extend. Each hexagonal block 5 can be formed by the circumferential grooves 3 adjacent to each other in the tire axial direction, and a plurality of the lateral grooves 4. In the present embodiment, the hexagonal block 5 can be formed in a barrel-like shape in which the block width at a mid-position 5c in the tire circumferential direction is greater than each of the block widths at both ends 5e, 5e in the tire circumferential direction.

Figure 2A:
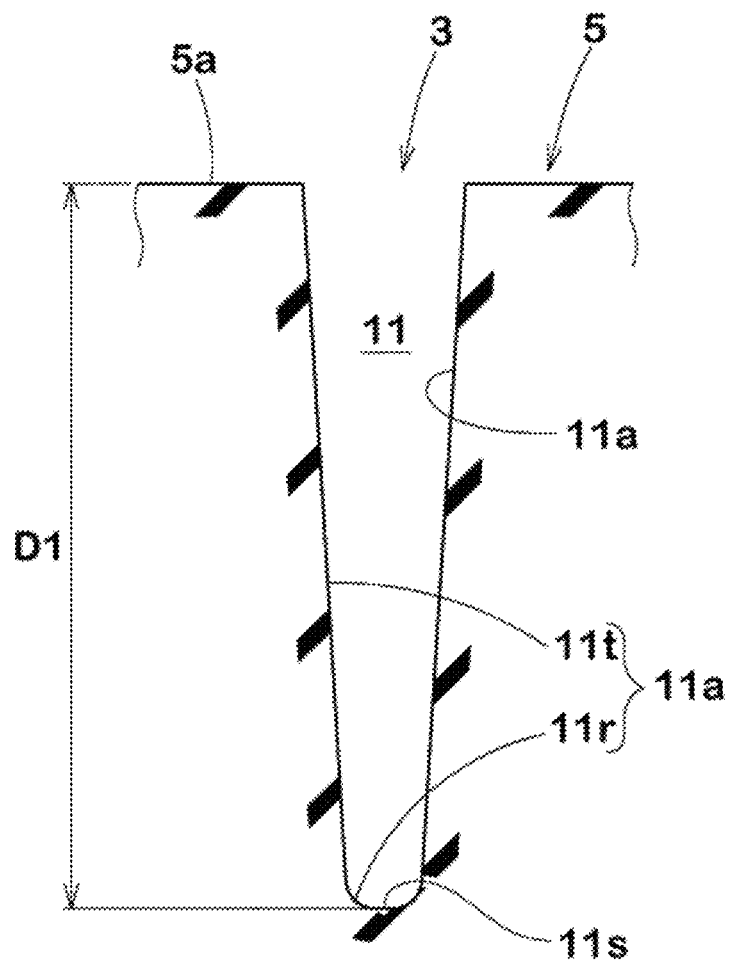
FIG. 2A is a cross-sectional view taken along a line A-A in FIG. 1.

FIG. 2A is a cross-sectional view taken along a line A-A in FIG. 1, and is a transverse cross-sectional view of the circumferential groove 3. As shown in FIG. 2A, a groove depth D1 of each of the plurality of the circumferential grooves 3 can be 21 mm or more, as an example. The circumferential groove 3 having such a structure can exhibit high life performance. In order to enhance life performance and uneven wear resistance in a well-balanced manner, the groove depth D1 of the circumferential groove 3 can be 22 mm or more and 26 mm or less.

As shown in FIG. 1, at each of the hexagonal blocks 5, a three-dimensional sipe 7 can be disposed so as to zigzag in the tire axial direction and the tire radial direction, and extend across the hexagonal block 5. In the three-dimensional sipe 7, wall surfaces 7a (shown in FIG. 3) of the sipe can mesh with each other when the tire 1 comes into contact with the ground, and the hexagonal block 5 can maintain high apparent stiffness and can inhibit slipping, and uneven wear resistance can thus be enhanced. Furthermore, since the three-dimensional sipe 7 can enhance apparent stiffness of the hexagonal block 5, life performance can be enhanced. In the present embodiment, the three-dimensional sipe 7 can be disposed at the mid-position 5c of the hexagonal block 5 in the tire circumferential direction. For example, the three-dimensional sipe 7 can extend between the zigzag vertexes 6 of the circumferential grooves 3.

Figure 3:
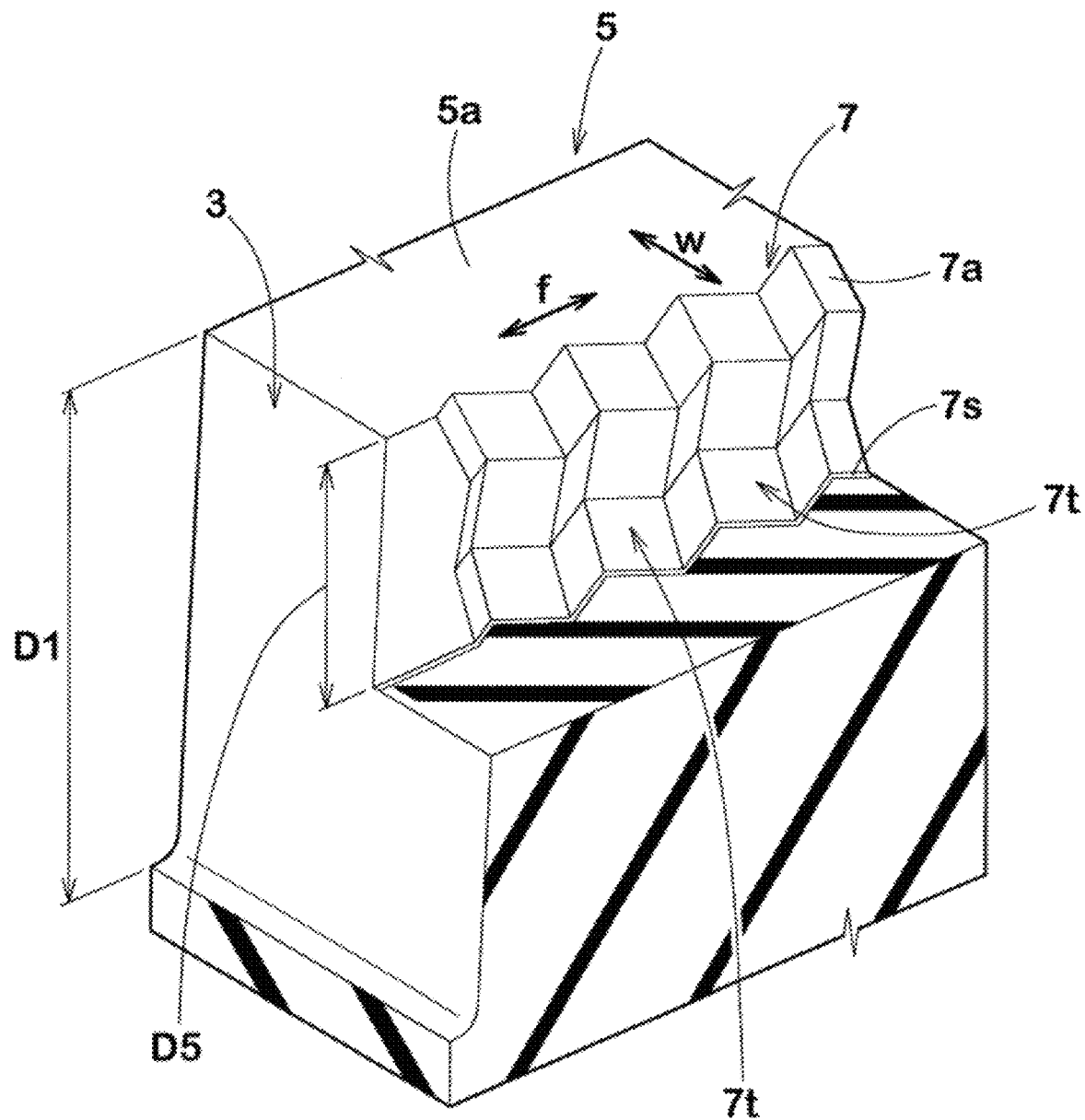
FIG. 3 is a perspective view conceptually illustrating a three-dimensional sipe.

FIG. 3 is a perspective view conceptually illustrating the three-dimensional sipe 7 according to one or more embodiments of the present disclosure. In the present embodiment, the three-dimensional sipe 7 can zigzag in a sipe length direction f and a sipe width direction w along the tire radial direction, and the wall surface 7a can be divided into parallelogram-shaped sections 7t to form a so-called Miura fold. Optionally, the wall surface 7a of the three-dimensional sipe 7 may be, for example, divided into rectangular sections. In the description herein, sipes such as the three-dimensional sipe 7 each refer to a cut recess having a width of 1.5 mm or less. Grooves such as the circumferential groove 3 and the lateral groove 4 each refer to a groove-like recess having a groove width of greater than 1.5 mm.

Figure 4:
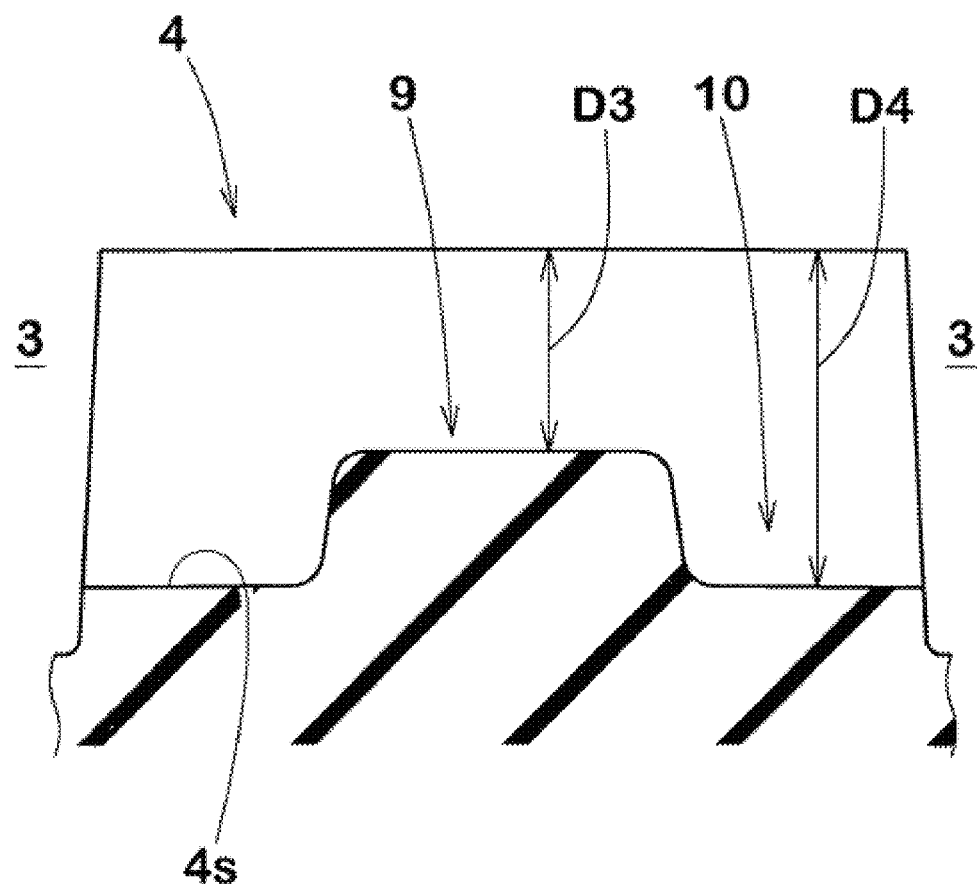
FIG. 4 is a cross-sectional view taken along a line B-B in FIG. 1.

FIG. 4 is a cross-sectional view taken along a line B-B in FIG. 1, and is a vertical cross-sectional view of the lateral groove 4. As shown in FIG. 1 and FIG. 4, each of the plurality of the lateral grooves 4 can include a raised portion 9 which can be formed by raising a groove bottom 4s of the lateral groove 4 to connect between the hexagonal blocks 5 adjacent to each other in the tire circumferential direction. Such a raised portion 9 can further inhibit slipping of the hexagonal block 5 during contact with the ground. Therefore, the tire 1 of the present embodiment can enhance life performance and uneven wear resistance.

In the present embodiment, the raised portion 9 can be disposed at a mid-position of the lateral groove 4 in the tire axial direction. The raised portion 9 may not be connected to both ends 4e, 4e (the zigzag vertexes 6) of the lateral groove 4 in the tire axial direction. In other words, in the present embodiment, the lateral groove 4 can include the raised portion 9, and deep bottom portions 10, 10 each of which can have a groove depth greater than the raised portion 9, and which can be disposed on both sides of the raised portion 9. The deep bottom portion 10 can contribute to enhancement of life performance.

A groove depth D3 of the raised portion 9 can be greater than or equal to 0.5 times a groove depth D4 of the deep bottom portion 10 and more preferably greater than or equal to 0.55 times the groove depth D4, and can be preferably less than or equal to 0.7 times the groove depth D4 and more preferably less than or equal to 0.65 times the groove depth D4. Since the groove depth D3 of the raised portion 9 can be greater than or equal to 0.5 times the groove depth D4 of the deep bottom portion 10, wet performance, which may be a basic performance required for the lateral groove 4, can be maintained. Since the groove depth D3 of the raised portion 9 can be less than or equal to 0.7 times the groove depth D4 of the deep bottom portion 10, slipping of the hexagonal block 5 can be effectively inhibited during contact with the ground.

In each of the plurality of the lateral grooves 4, a length Lb of the raised portion 9 in the tire axial direction can be preferably less than a length La of the lateral groove 4 in the tire axial direction. Thus, the deep bottom portion 10 of the lateral groove 4 can be formed and life performance can be enhanced. Furthermore, the groove volume of the lateral groove 4 can be ensured, and wet performance can be maintained. Meanwhile, if the length Lb of the raised portion 9 is excessively less than the length La of the lateral groove 4, slipping of the hexagonal block 5 may not be inhibited during contact with the ground. From these viewpoints, the length Lb of the raised portion 9 can be more preferably greater than or equal to 0.4 times the length La of the lateral groove 4 and even more preferably greater than or equal to 0.45 times the length La, and more preferably less than or equal to 0.6 times the length La and even more preferably less than or equal to 0.55 times the length La.

In each of the plurality of the lateral grooves 4, the groove depth D3 at the raised portion 9 can be preferably greater than or equal to 0.45 times the groove depth D1 (shown in FIG. 2A) of the circumferential groove 3 to which the lateral groove 4 is connected and more preferably greater than or equal to 0.5 times the groove depth D1, and preferably less than or equal to 0.8 times the groove depth D1 and more preferably less than or equal to 0.7 times the groove depth D1. Since the groove depth D3 at the raised portion 9 can be greater than or equal to 0.45 times the groove depth D1 of the circumferential groove 3, life performance enhancing effect can be maintained, and wet performance can also be maintained high. Since the groove depth D3 at the raised portion 9 can be less than or equal to 0.8 times the groove depth D1 of the circumferential groove 3, slipping of the hexagonal block 5 can be effectively inhibited.

Figure 5:
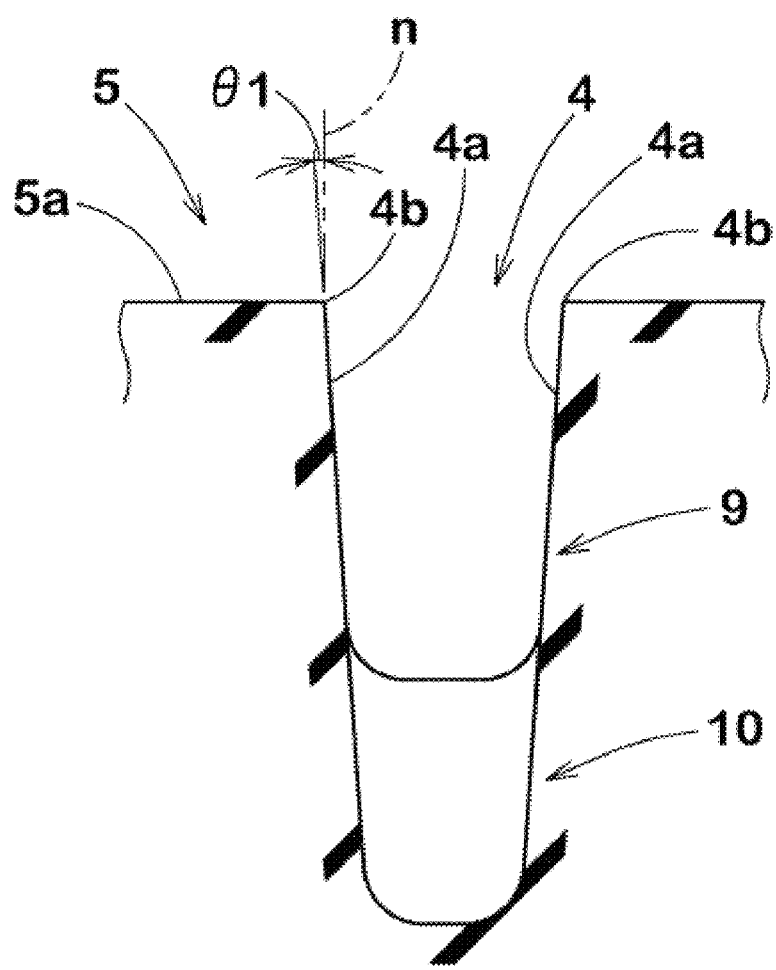
FIG. 5 is a cross-sectional view taken along a line C-C in FIG. 1.

FIG. 5 is a cross-sectional view taken along a line C-C in FIG. 1, and is a transverse cross-sectional view of the lateral groove 4. As shown in FIG. 5, each of the plurality of the lateral grooves 4 can include a pair of groove walls 4a, and a pair of groove edges 4b located at positions at which the pair of groove walls 4a and a tread surface 5a of the hexagonal blocks 5 intersect each other. Each of the pair of groove walls 4a can be preferably inclined at an angle $\theta 1$ from 3° to 8° relative to a normal linen passing through a corresponding one of the pair of groove edges 4b so as to be normal to the tread surface 5a. Since the angle $\theta 1$ can be 3° or more, the hexagonal block 5 can be inhibited from falling down, and uneven wear resistance can be maintained. Since the angle $\theta 1$ can be 8° or less, the block volume of the hexagonal block 5 can be maintained, and reduction of the block stiffness can be inhibited, so that uneven wear resistance and life performance can be maintained high. Furthermore, the groove volume of the lateral groove 4 can be maintained, and degradation of wet performance can thus be inhibited. In order to effectively exhibit such effects, the angle $\theta 1$ can be more preferably 4° or more and more preferably 7° or less. The groove wall 4a having the angle $\theta 1$ can be, for example, formed at the raised portion 9 and the deep bottom portions 10.

A groove width W2 (shown in FIG. 1) of each of the plurality of the lateral grooves 4 can be preferably 7 mm or more and more preferably 7.5 mm or more, and preferably 9 mm or less and more preferably 8.5 mm or less. Since the groove width W2 of the lateral groove 4 can be 7 mm or more, the basic wet performance can be maintained high. Since the groove width W2 of the lateral groove 4 can be 9 mm or less, the pattern stiffness of the tread portion 2 can be inhibited from being reduced.

As shown in FIG. 3, a depth D5 of the three-dimensional sipe 7 can be preferably greater than or equal to 0.5 times the groove depth D1 of the circumferential groove 3 to which the three-dimensional sipe 7 is connected and more preferably greater than or equal to 0.6 times the groove depth D1, and preferably less than or equal to 0.8 times the groove depth D1 and more preferably less than or equal to 0.7 times the groove depth D1. Since the depth D5 of the three-dimensional sipe 7 can be greater than or equal to 0.5 times the groove depth D1 of the circumferential groove 3 to which the three-dimensional sipe 7 is connected, an effect exhibited by the three-dimensional sipe 7 for maintaining high apparent stiffness can be effectively exhibited. Since the depth D5 of the three-dimensional sipe 7 can be less than or equal to 0.8 times the groove depth D1 of the circumferential groove 3 to which the three-dimensional sipe 7 is connected, block stiffness of the hexagonal block 5 can be maintained high, and uneven wear resistance can thus be enhanced.

As shown in FIG. 1, for instance, in a pair P of the lateral groove 4 and the hexagonal block 5 which are adjacent to each other in the tire circumferential direction, the groove depth D3 (shown in FIG. 4) at the raised portion 9 formed in the lateral groove 4 can be less than the depth D5 (shown in FIG. 3) of the three-dimensional sipe 7 formed in the hexagonal block 5. Thus, an effect exhibited by the raised portion 9 for inhibiting slipping of the hexagonal block 5 in the tire circumferential direction can be exhibited. Furthermore, an effect of causing the wall surfaces 7a of the three-dimensional sipe 7 to mesh with each other with respect to a lateral force during cornering can be exhibited. Therefore, uneven wear resistance can be further enhanced. If the groove depth D3 at the raised portion 9 is excessively less than the depth D5 of the three-dimensional sipe 7, wet performance may be degraded. In order to effectively exhibit the above-described effects, the groove depth D3 at the raised portion 9 can be preferably greater than or equal to 0.65 times the depth D5 of the three-dimensional sipe 7 and more preferably greater than or equal to 0.7 times the depth D5, and preferably less than or equal to 0.95 times the depth D5 and more preferably less than or equal to 0.9 times the depth D5.

The hexagonal block 5 can be formed such that a maximum width Wm thereof in the tire axial direction is less than a maximum length Lm thereof in the tire circumferential direction. The hexagonal block 5 having such a structure can have high stiffness in the tire circumferential direction, and can inhibit great slipping caused by acceleration or deceleration. In order to exhibit such an effect and an effect of inhibiting slipping caused by cornering in a well-balanced manner, a ratio (Wm/Lm) of the maximum width Wm to the maximum length Lm in the hexagonal block 5 can be preferably 0.75 or more and more preferably 0.8 or more, and preferably 0.9 or less and more preferably 0.85 or less.

Figure 6:
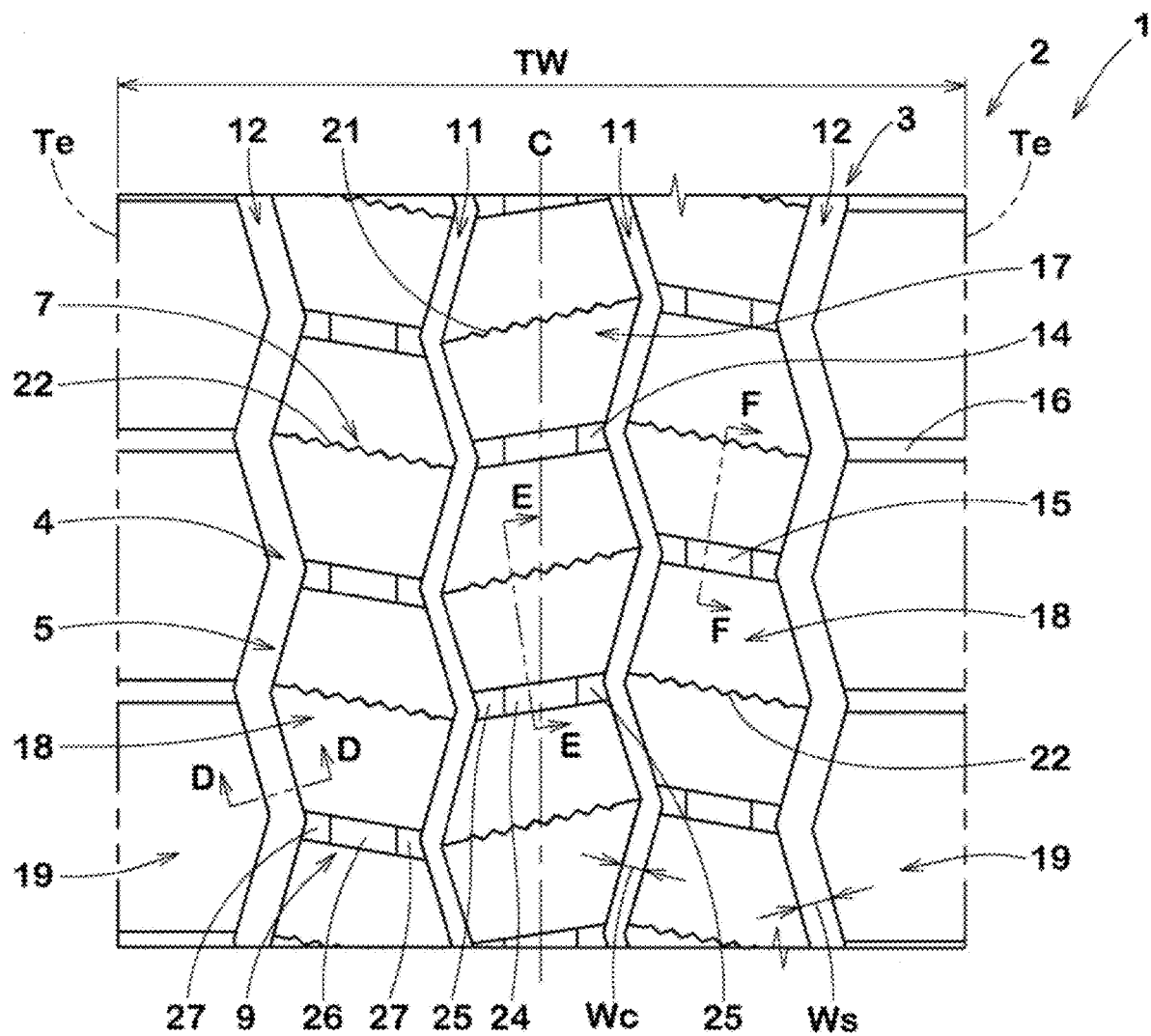
FIG. 6 is a plan view of a portion of the tread portion between tread ends of the tread portion.

FIG. 6 is a plan view of a portion of the tread portion 2 between tread ends Te and Te of the tread portion 2 including the circumferential grooves 3, the lateral grooves 4, the hexagonal blocks 5, and the like of the present disclosure as described above. FIG. 6 shows one embodiment of the present disclosure, but the present disclosure is not limited thereto.

In the description herein, the "tread end Te" can represent an outermost ground contact position in the tire axial direction as obtained when a standardized load is applied to the tire 1 in a standardized state and the tire 1 is in contact with a plane at a camber angle of 0°. A distance in the tire axial direction between the tread ends Te on both the sides can be regarded as a tread width TW.

The "standardized state" can refer to a state in which the tire is mounted on a standardized rim and is inflated to a standardized internal pressure, and no load is applied. In the description herein, unless otherwise specified, the dimension and the like of each component of the tire 1 can be represented by a value measured in the standardized state.

The "standardized rim" can represent a rim that is defined, in a standard system including a standard on which the tire 1 is based, by the standard for each tire, and can be, for example, "standard rim" in the JATMA standard, "Design Rim" in the TRA standard, or "Measuring Rim" in the ETRTO standard.

The "standardized internal pressure" can represent an air pressure that is defined, in a standard system including a standard on which the tire 1 is based, by the standard for each tire, and can be, for example, "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

The "standardized load" can represent a load that is defined, in a standard system including a standard on which the tire 1 is based, by the standard for each tire, and can be, for example, "maximum load capacity" in the JATMA standard, the maximum value recited in the table "TIRE LOAD LIMITS AT VARIOUS COLD INFLATION PRESSURES" in the TRA standard, or "LOAD CAPACITY" in the ETRTO standard.

As shown in FIG. 6, in the present embodiment, the plurality of the circumferential grooves 3 can include a pair of crown circumferential grooves 11, and a pair of shoulder circumferential grooves 12 disposed outwardly of the pair of crown circumferential grooves 11 in the tire axial direction. The pair of crown circumferential grooves 11 can be, for example, disposed on both sides, respectively, of a tire equator C.

Figure 2B:
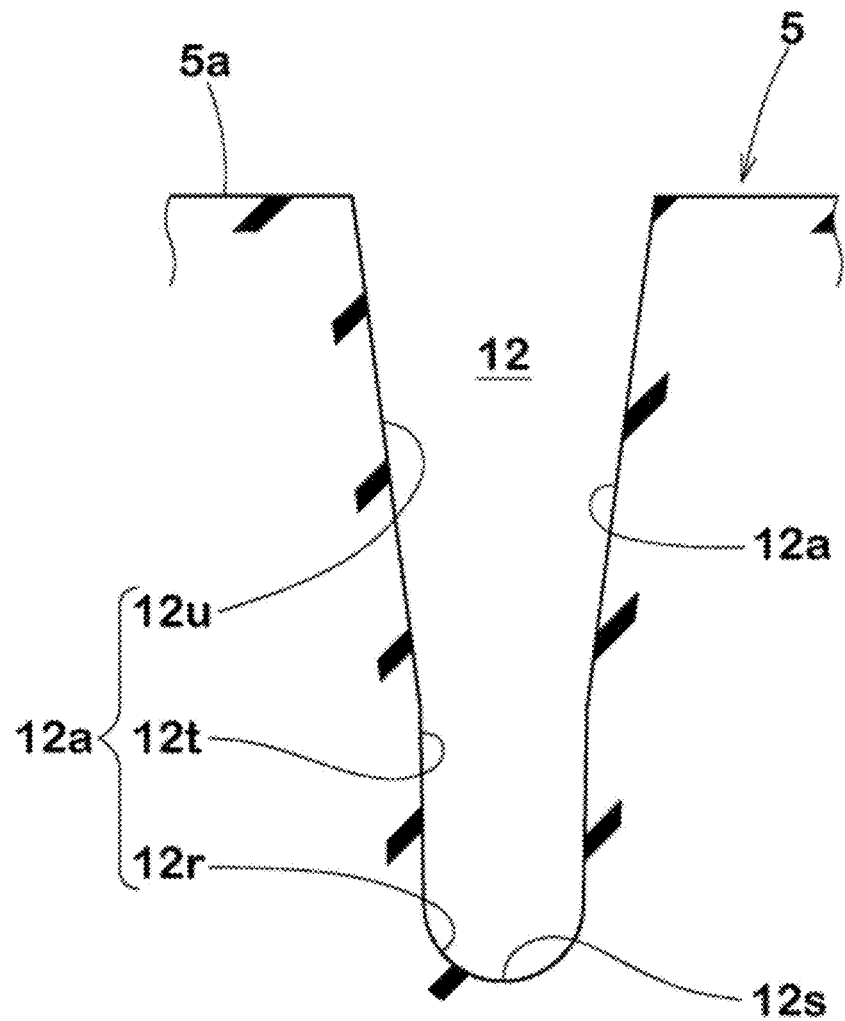
FIG. 2B is a cross-sectional view taken along a line D-D in FIG. 6.

Specifically, FIG. 2A is a transverse cross-sectional view of the crown circumferential groove 11. FIG. 2B is a cross-sectional view taken along a line D-D in FIG. 6 and is a transverse cross-sectional view of the shoulder circumferential groove 12. As shown in FIG. 2A, each of groove walls 11a of the crown circumferential groove 11 can include, for example, an arc portion 11r that is raised from a groove bottom 11s so as to be arc-shaped, and a linear portion 11t that extends linearly so as to connect between the arc portion 11r and the tread surface 5a of the hexagonal block 5. As shown in FIG. 2B, each of groove walls 12a of the shoulder circumferential groove 12 can include, for example, an arc portion 12r that is raised from a groove bottom 12s so as to be arc-shaped, a first linear portion 12t connected to the arc portion 12r, and a second linear portion 12u connected to the first linear portion 12t. The second linear portion 12u can be inclined relative to the tread surface 5a at a gentler angle than the first linear portion 12t, and can be connected to the first linear portion 12t at or almost at a mid-portion, in the groove depth, of the shoulder circumferential groove 12. The second linear portion 12u having such a structure can effectively inhibit slipping of blocks (middle block 18 and shoulder block 19 described below) which can be on both sides of the shoulder circumferential groove 12 and on which a high lateral force acts during cornering.

As shown in FIG. 6, a groove width Wc of the crown circumferential groove 11 can be, for example, less than a groove width Ws of the shoulder circumferential groove 12. Thus, tread stiffness can be maintained high near the tire equator C on which a high ground-contact pressure acts. The groove width Wc of the crown circumferential groove 11 can be preferably greater than or equal to 0.55 times the groove width Ws of the shoulder circumferential groove 12 and more preferably greater than or equal to 0.6 times the groove width Ws, and preferably less than or equal to 0.75 times the groove width Ws and more preferably less than or equal to 0.7 times the groove width Ws. The groove width Ws of the shoulder circumferential groove 12 can be preferably greater than or equal to 2% of the tread width TW and more preferably greater than or equal to 3% of the tread width TW, and preferably less than or equal to 6% of the tread width TW and more preferably less than or equal to 5% of the tread width TW.

In the present embodiment, the plurality of lateral grooves 4 can include a plurality of crown lateral grooves 14 connecting between the pair of the crown circumferential grooves 11, and a plurality of middle lateral grooves 15 connecting between the crown circumferential groove 11 and the shoulder circumferential groove 12 which can be adjacent to each other in the tire axial direction.

The hexagonal blocks 5 can include, for example, a plurality of crown blocks 17 formed between the pair of the crown circumferential grooves 11, and a plurality of middle blocks 18 formed between the crown circumferential groove 11 and the shoulder circumferential groove 12 which can be adjacent to each other in the tire axial direction. Each crown block 17 can be located on the tire equator C in the present embodiment. The middle blocks 18 can be, for example, located on both sides, respectively, of the tire equator C.

The tread portion 2 can include, for example, a plurality of shoulder shallow lateral grooves 16 connecting between the shoulder circumferential grooves 12 and the tread ends Te. Thus, the tread portion 2 can include a plurality of shoulder blocks 19 each demarcated by the shoulder circumferential groove 12, the tread end Te, and the shoulder shallow lateral grooves 16. The shoulder shallow lateral groove 16 can be, for example, formed so as to have a groove depth less than that of each of the plurality of the lateral grooves 4.

A loss tangent tan δ of tread rubber of the tread portion 2 forming the hexagonal blocks 5 can be preferably 0.1 or less and more preferably 0.09 or less. Since the loss tangent tan δ can be 0.1 or less, heat generation of the tread rubber can be inhibited, and deformation of the tread rubber can be inhibited. Thus, occurrence of uneven wear can be inhibited. The tread rubber can also form the shoulder blocks 19. The loss tangent tan δ can be measured under the following conditions in accordance with "JIS K 6394."

Measurement device: viscoelastometer
Initial strain: 10%
Dynamic strain: 1%
Frequency: 10 Hz
Deformation mode: stretch
Measurement temperature: 70° C.

The three-dimensional sipes 7 can include a crown sipe 21 disposed in each of the plurality of crown blocks 17, and a middle sipe 22 disposed in each of the plurality of middle blocks 18. The crown sipe 21 and the middle sipe 22 can each extend between the zigzag vertexes 6 of the circumferential grooves 3.

The raised portions 9 can include crown raised portions 24 disposed in the crown lateral grooves 14 and middle raised portions 26 disposed in the middle lateral grooves 15. Thus, the crown lateral groove 14 can include the crown raised portion 24 and crown deep bottom portions 25, 25 disposed on both sides of the crown raised portion 24. The middle lateral groove 15 can include the middle raised portion 26 and middle deep bottom portions 27, 27 disposed on both sides of the middle raised portion 26.

Figure 7A:
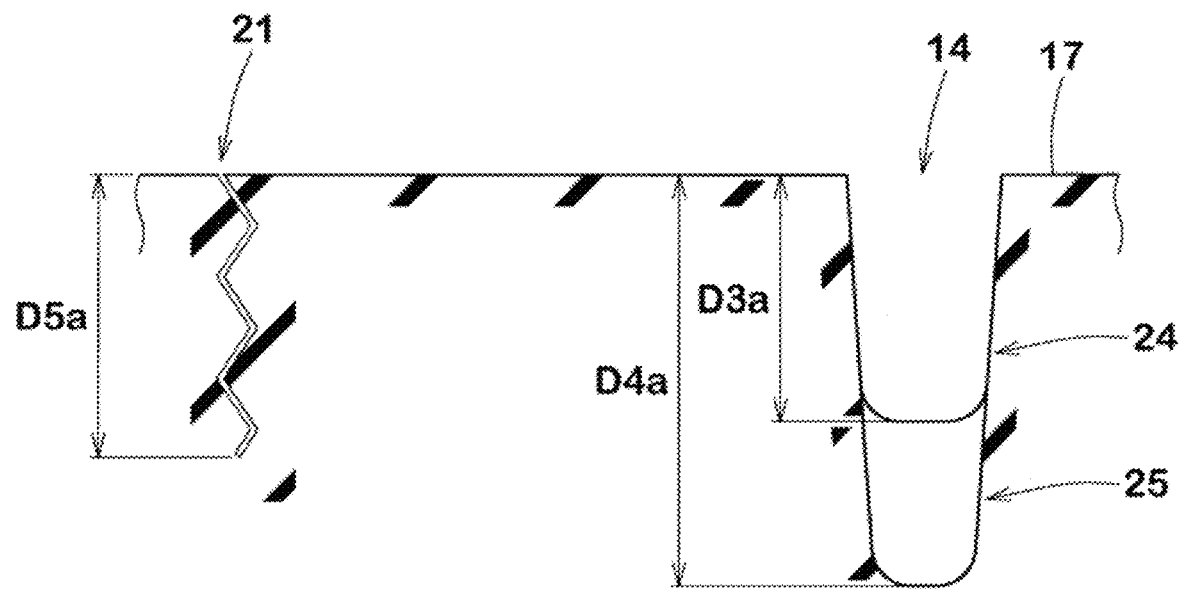
FIG. 7A is a cross-sectional view taken along a line E-E in FIG. 6.
Figure 7B:
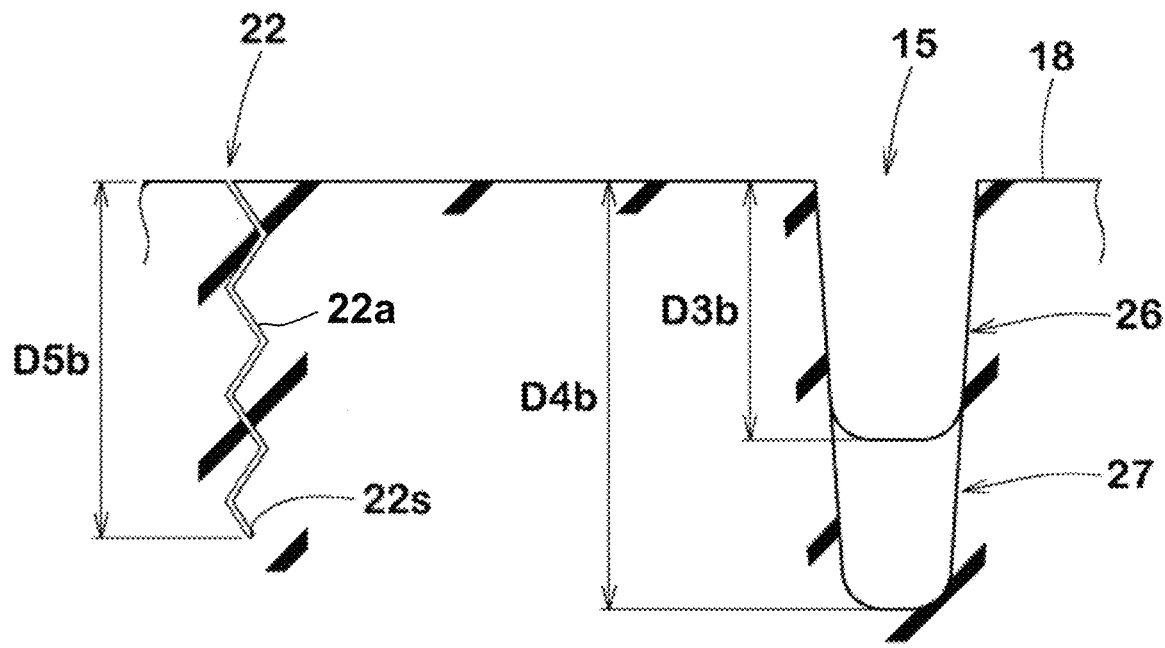
FIG. 7B is a cross-sectional view taken along a line F-F in FIG. 6.

FIG. 7A is a cross-sectional view taken along a line E-E in FIG. 6, and is a transverse cross-sectional view of the crown sipe 21 and the crown lateral groove 14. FIG. 7B is a cross-sectional view taken along a line F-F in FIG. 6, and is a transverse cross-sectional view of the middle sipe 22 and the middle lateral groove 15. As shown in FIG. 7, a maximum depth D5b of the middle sipe 22 can be greater than a maximum depth D5a of the crown sipe 21. Thus, in the middle block 18 on which a higher lateral force than that on the crown block 17 acts during cornering, a force for causing wall surfaces 22a of the middle sipe 22 to mesh with each other can be increased, apparent stiffness of the middle block 18 can become higher, and slipping can be thus more effectively inhibited. The maximum depth D5b of the middle sipe 22 can be, but is not particularly limited to, preferably greater than or equal to 1.1 times the maximum depth D5a of the crown sipe 21 and more preferably greater than or equal to 1.15 times the maximum depth D5a, and preferably less than or equal to 1.3 times the maximum depth D5a and more preferably less than or equal to 1.25 times the maximum depth D5a.

A groove depth D3a at the crown raised portion 24 can be, for example, equal to a groove depth D3b at the middle raised portion 26. Thus, slipping of the crown block 17 and slipping of the middle block 18 can be inhibited in a well-balanced manner. That the groove depth D3a and the groove depth D3b can be equal to each other can mean that an absolute value of a difference between the groove depth D3a and the groove depth D3b is 0 mm, and also can mean that the absolute value of the difference is 2 mm or less, in the description herein.

In order to effectively exhibit the above-described effects, a maximum groove depth (groove depth at the crown deep bottom portion 25) D4a of the crown lateral groove 14 can be more preferably equal to a maximum groove depth (groove depth at the middle deep bottom portion 27) D4b of the middle lateral groove 15. That the maximum groove depth D4a and the maximum groove depth D4b can be equal to each other can mean that an absolute value of a difference between the maximum groove depth D4a and the maximum groove depth D4b can be 0 mm, and also can mean that the absolute value of the difference can be 2 mm or less, in the description herein.

A difference (D5a-D3a) between the maximum depth D5a of the crown sipe 21 and the groove depth D3a of the crown raised portion 24 can be, for example, less than a difference (D5b-D3b) between the maximum depth D5b of the middle sipe 22 and the groove depth D3b of the middle raised portion 26. Thus, stiffness, in the tire circumferential direction, of the crown block 17 on which a high ground contact pressure acts can be maintained high, and slipping in the tire circumferential direction can be greatly reduced. If the difference (D5a-D3a) is excessively less than the difference (D5b-D3b), balance in stiffness between the crown block 17 and the middle block 18 may be degraded, and uneven wear resistance may be reduced. From such a viewpoint, the difference (D5a-D3a) can be preferably greater than or equal to 0.25 times the difference (D5b-D3b) and more preferably greater than or equal to 0.3 times the difference (D5b-D3b), and preferably less than or equal to 0.45 times the difference (D5b-D3b) and more preferably less than or equal to 0.4 times the difference (D5b-D3b).

Although one embodiment of the present disclosure has been described above in detail, the present disclosure is not limited to the above-described specific embodiment, and various modifications can be made to implement the technique of the present disclosure.

EXAMPLES

Tires having the basic pattern shown in FIG. 6 were produced as test tires based on the specifications indicated in Table 1 to Table 6, and tested for life performance, uneven wear resistance, and wet performance. The common specifications and the test methods are as follows.

Size: 295/75R22.5
Rim: 8.25×22.5
Internal pressure: 750 kPa

Life Performance·Uneven Wear Resistance

A test driver drove a test vehicle having the test tires mounted to all the wheels and caused the test vehicle to run on a test course having an asphalt road surface. A running distance per 1 mm of a wear amount of the crown circumferential groove in the rear wheel (driving wheel) tire was measured after the running. The results are each indicated by an index with the running distance per 1 mm of the wear amount in a comparative example in each table being 100. The greater the value is, the longer the running distance is and the more excellent the life performance is. After the running, a state in which uneven wear such as heel-and-toe wear occurred was confirmed by the test driver.

Test vehicle: 10-ton truck, loaded with cargo corresponding to 50% of standard payload at the front portion of a truck bed Running distance: 10000 Km Wet Performance A test driver drove the above-described test vehicle and caused the test vehicle to run on a wet asphalt road surface having a water depth of 3 mm. At this time, a running time was measured when the test vehicle in a stopped state was accelerated and caused to run over a certain distance. The results are each indicated by an index with the running time in the comparative example in each table being 100. The less the value is, the shorter the running time is and the more excellent the wet performance is.

Table 1 to Table 6 indicate the test results.

TABLE 1

|  | Example 1 | Comparative example 1 |
|---|---|---|
| Presence or absence of three-dimensional sipe | present | present |
| Presence or absence of raised portion | present | present |
| D1 (mm) | 24 | 20 |
| Life performance [Index, the greater the value is, the better the life performance is] | 120 | 100 |
| Uneven wear resistance [presence or absence] | absent | absent |
| Wet performance [Index, the less the value is, the better the wet performance is] | 100 | 100 |

TABLE 2

|  | Example 2 | Comparative example 2 |
|---|---|---|
| Presence or absence of three-dimensional sipe | present | present |
| Presence or absence of raised portion | present | present |
| D1 (mm) | 24 | 20 |
| Lb/La | 0.55 | 0.65 |
| Life performance [Index, the greater the value is, the better the life performance is] | 115 | 100 |
| Uneven wear resistance [presence or absence] | absent | absent |

TABLE 2-continued

|  | Example 2 | Comparative example 2 |
|---|---|---|
| Wet performance [Index, the less the value is, the better the wet performance is] | 95 | 100 |

TABLE 3

|  | Example 3 | Comparative example 3 |
|---|---|---|
| Presence or absence of three-dimensional sipe | present | present |
| Presence or absence of raised portion | present | present |
| D1 (mm) | 24 | 20 |
| D3/D1 | 0.5 | 0.9 |
| Life performance [Index, the greater the value is, the better the life performance is] | 125 | 100 |
| Uneven wear resistance [presence or absence] | absent | present |
| Wet performance [Index, the less the value is, the better the wet performance is] | 100 | 100 |

TABLE 4

|  | Example 4 | Comparative example 4 |
|---|---|---|
| Presence or absence of three-dimensional sipe | present | present |
| Presence or absence of raised portion | present | present |
| D1 (mm) | 24 | 20 |
| D3/D1 | 0.6 | 0.85 |
| Life performance [Index, the greater the value is, the better the life performance is] | 125 | 100 |
| Uneven wear resistance [presence or absence] | absent | present |
| Wet performance [Index, the less the value is, the better the wet performance is] | 100 | 100 |

TABLE 5

|  | Example 5 | Comparative example 5 |
|---|---|---|
| Presence or absence of three-dimensional sipe | present | present |
| Presence or absence of raised portion | present | present |
| D1 (mm) | 24 | 20 |
| $\theta 1$ (°) | 4 | 1 |
| Life performance [Index, the greater the value is, the better the life performance is] | 120 | 100 |
| Uneven wear resistance [presence or absence] | absent | present |
| Wet performance [Index, the less the value is, the better the wet performance is] | 100 | 100 |

TABLE 6

|  | Example 6 | Comparative example 6 |
|---|---|---|
| Presence or absence of three-dimensional sipe | present | present |
| Presence or absence of raised portion | present | present |
| D1 (mm) | 24 | 20 |
| W2 (mm) | 8 | 5 |
| Life performance [Index, the greater the value is, the better the life performance is] | 115 | 100 |
| Uneven wear resistance [presence or absence] | absent | absent |
| Wet performance [Index, the less the value is, the better the wet performance is] | 95 | 100 |

According to the test results, it is understood that the tires of the examples had at least life performance enhanced as compared with the tires of the comparative examples.

Appendix

The present disclosure includes the following aspects.

Disclosure 1

A heavy duty tire including a tread portion, in which
the tread portion includes a plurality of circumferential grooves zigzagging in a tire circumferential direction so as to form zigzag vertexes, a plurality of lateral grooves connecting between the zigzag vertexes of the circumferential grooves adjacent to each other in a tire axial direction, and a plurality of hexagonal blocks formed by the circumferential grooves adjacent to each other in the tire axial direction and the plurality of lateral grooves,
the plurality of circumferential grooves each have a groove depth of 21 mm or more,
each of the plurality of hexagonal blocks includes a three-dimensional sipe zigzagging in the tire axial direction and a tire radial direction and extending across the corresponding hexagonal block, and
each of the plurality of lateral grooves includes a raised portion formed by raising a groove bottom of the corresponding lateral groove to connect between the hexagonal blocks adjacent to each other in the tire circumferential direction.

Disclosure 2

In the heavy duty tire according to Disclosure 1, in each of the plurality of lateral grooves, a length of the raised portion in the tire axial direction is less than a length of the lateral groove in the tire axial direction.

Disclosure 3

In the heavy duty tire according to Disclosure 1 or Disclosure 2, in each of the plurality of lateral grooves, the length of the raised portion in the tire axial direction is 0.4 to 0.6 times the length of the lateral groove in the tire axial direction.

Disclosure 4

In the heavy duty tire according to any one of Disclosure 1 to Disclosure 3, in each of the plurality of lateral grooves, a groove depth at the raised portion is 0.5 to 0.8 times a groove depth of each circumferential groove to which the lateral groove is connected.

Disclosure 5

In the heavy duty tire according to any one of Disclosure 1 to Disclosure 4, a depth of each three-dimensional sipe is 0.5 to 0.8 times a groove depth of each circumferential groove to which the three-dimensional sipe is connected.

Disclosure 6

In the heavy duty tire according to any one of Disclosure 1 to Disclosure 5,
each of the plurality of lateral grooves includes a pair of groove walls, and a pair of groove edges located at positions at which the pair of groove walls and a tread surface of the hexagonal blocks intersect each other, and
each of the pair of groove walls is inclined at an angle from 3° to 8° relative to a normal line passing through a corresponding one of the pair of groove edges so as to be normal to the tread surface.

Disclosure 7

In the heavy duty tire according to any one of Disclosure 1 to Disclosure 6, each of the plurality of lateral grooves has a groove width of 7 to 9 mm.

Disclosure 8

In the heavy duty tire according to any one of Disclosure 1 to Disclosure 7, in a pair of the lateral groove and the hexagonal block which are adjacent to each other in the tire circumferential direction, a groove depth at the raised portion formed in the lateral groove is less than a depth of the three-dimensional sipe formed in the hexagonal block.

Disclosure 9

In the heavy duty tire according to any one of Disclosure 1 to Disclosure 8,
the plurality of circumferential grooves includes a pair of crown circumferential grooves, and a pair of shoulder circumferential grooves disposed outwardly of the pair of crown circumferential grooves in the tire axial direction,
the plurality of lateral grooves includes a plurality of crown lateral grooves connecting between the pair of crown circumferential grooves, and a plurality of middle lateral grooves each connecting between the crown circumferential groove and the shoulder circumferential groove which are adjacent to each other in the tire axial direction,
the raised portion includes a crown raised portion and a middle raised portion formed in each crown lateral groove and each middle lateral groove, respectively, and
a groove depth at the crown raised portion is equal to a groove depth at the middle raised portion.

Disclosure 10

In the heavy duty tire according to any one of Disclosure 1 to Disclosure 9, a maximum groove depth of the crown lateral groove is equal to a maximum groove depth of the middle lateral groove.

Disclosure 11

In the heavy duty tire according to any one of Disclosure 1 to Disclosure 10, the hexagonal blocks include a plurality of crown blocks formed between the pair of crown circumferential grooves, and a plurality of middle blocks formed between the crown circumferential groove and the shoulder circumferential groove which are adjacent to each other in the tire axial direction, the three-dimensional sipes include a crown sipe disposed in each of the plurality of crown blocks, and a middle sipe disposed in each of the plurality of middle blocks, and a maximum depth of the middle sipe is greater than a maximum depth of the crown sipe.

Disclosure 12

The heavy duty tire according to any one of Disclosure 1 to Disclosure 11, wherein each of the lateral grooves extends from one of the circumferential grooves to another of the circumferential grooves.

Disclosure 13

The heavy duty tire according to any one of Disclosure 1 to Disclosure 12, wherein the lateral grooves are linear and extend at first acute angle relative to the tire axial direction, and wherein the three-dimensional sipes extend at a second acute angle relative to the tire axial direction.

Disclosure 14

The heavy duty tire according to any one of Disclosure 1 to Disclosure 13, wherein, for each of the hexagonal blocks, a maximum width in the tire axial direction is less than a maximum length in the tire circumferential direction.

Disclosure 15

The heavy duty tire according to any one of Disclosure 1 to Disclosure 14, wherein a ratio of the maximum width to the maximum length is from 0.75 to 0.90 inclusive.

Disclosure 16

The heavy duty tire according to any one of Disclosure 1 to Disclosure 15, wherein the plurality of circumferential grooves include a plurality of shoulder circumferential grooves and a plurality of crown circumferential grooves, and wherein a first maximum width of the shoulder circumferential grooves is greater than a second maximum width of the crown circumferential grooves.

Disclosure 17

A heavy duty tire comprising: a tread portion, wherein the tread portion includes: a plurality of circumferential grooves zigzagging in a tire circumferential direction so as to form zigzag vertexes, a plurality of lateral grooves connecting between the zigzag vertexes of the circumferential grooves adjacent to each other in a tire axial direction, and a plurality of hexagonal blocks formed by the circumferential grooves adjacent to each other in the tire axial direction and the plurality of lateral grooves, wherein the plurality of circumferential grooves each have a groove depth of 21 mm or more, wherein each of the plurality of hexagonal blocks comprises a three-dimensional sipe zigzagging in the tire axial direction and a tire radial direction and extending across the corresponding hexagonal block, wherein each of the plurality of lateral grooves comprises a raised portion formed by raising a groove bottom of the corresponding lateral groove to connect between the hexagonal blocks adjacent to each other in the tire circumferential direction, wherein, in each of the plurality of lateral grooves, a length of the raised portion in the tire axial direction is less than a length of the lateral groove in the tire axial direction, wherein, in each of the plurality of lateral grooves, the length of the raised portion in the tire axial direction is 0.4 to 0.6 times the length of the lateral groove in the tire axial direction, wherein, in each of the plurality of lateral grooves, a groove depth at the raised portion is 0.5 to 0.8 times a groove depth of each circumferential groove to which the lateral groove is connected, wherein a depth of each three-dimensional sipe is 0.5 to 0.8 times a groove depth of each circumferential groove to which the three-dimensional sipe is connected, wherein each of the plurality of lateral grooves comprises a pair of groove walls, and a pair of groove edges located at positions at which the pair of groove walls and a tread surface of the hexagonal blocks intersect each other, wherein each of the pair of groove walls is inclined at an angle from 3° to 8° relative to a normal line passing through a corresponding one of the pair of groove edges so as to be normal to the tread surface, and wherein each of the plurality of lateral grooves has a groove width of 7 to 9 mm.

Disclosure 18

The heavy duty tire according to Disclosure 17, wherein the lateral grooves are linear and extend at first acute angle relative to the tire axial direction, and wherein the three-dimensional sipes extend at a second acute angle relative to the tire axial direction

Disclosure 19

The heavy duty tire according to Disclosure 17 or Disclosure 18, wherein, for each of the hexagonal blocks, a maximum width in the tire axial direction is less than a maximum length in the tire circumferential direction, and wherein a ratio of the maximum width to the maximum length is from 0.75 to 0.90 inclusive.

Disclosure 20

The heavy duty tire according to any one of Disclosure 17 to Disclosure 19, wherein the plurality of circumferential grooves include a plurality of shoulder circumferential grooves and a plurality of crown circumferential grooves, and wherein a first maximum width of the shoulder circumferential grooves is greater than a second maximum width of the crown circumferential grooves.

The heavy duty tire of the present disclosure has the above-described configuration, and thus allows enhancement of life performance and uneven wear resistance.

What is claimed is:

1. A heavy duty tire comprising:
a tread portion,
wherein the tread portion includes:
a plurality of circumferential grooves zigzagging in a tire circumferential direction so as to form zigzag vertexes,
a plurality of lateral grooves connecting between the zigzag vertexes of the circumferential grooves adjacent to each other in a tire axial direction, and
a plurality of hexagonal blocks formed by the circumferential grooves adjacent to each other in the tire axial direction and the plurality of lateral grooves,
wherein the plurality of circumferential grooves each have a groove depth of 21 mm or more,
wherein each of the plurality of hexagonal blocks comprises a three-dimensional sipe zigzagging in the tire axial direction and a tire radial direction and extending across the corresponding hexagonal block,
wherein each of the plurality of lateral grooves comprises a raised portion formed by raising a groove bottom of the corresponding lateral groove to connect between the hexagonal blocks adjacent to each other in the tire circumferential direction,
wherein the plurality of circumferential grooves comprises a pair of crown circumferential grooves, and a pair of shoulder circumferential grooves disposed outwardly of the pair of crown circumferential grooves in the tire axial direction,
wherein the plurality of lateral grooves comprises a plurality of crown lateral grooves connecting between the pair of crown circumferential grooves, and a plurality of middle lateral grooves each connecting between the crown circumferential groove and the shoulder circumferential groove which are adjacent to each other in the tire axial direction,
wherein the raised portion comprises a crown raised portion and a middle raised portion formed in each crown lateral groove and each middle lateral groove, respectively,
wherein a groove depth at the crown raised portion is equal to a groove depth at the middle raised portion,
wherein the hexagonal blocks comprise a plurality of crown blocks formed between the pair of crown circumferential grooves, and a plurality of middle blocks formed between the crown circumferential groove and the shoulder circumferential groove which are adjacent to each other in the tire axial direction,
wherein the three-dimensional sipes comprise a crown sipe disposed in each of the plurality of crown blocks, and a middle sipe disposed in each of the plurality of middle blocks,
wherein a maximum depth of the middle sipe is greater than a maximum depth of the crown sipe,
wherein a first difference between the maximum depth of the crown sipe and the groove depth of the crown raised portion is less than a second difference between the maximum depth of the middle sipe and the groove depth of the middle raised portion, and
wherein the first difference between the maximum depth of the crown sipe and the groove depth of the crown raised portion is 0.3 to 0.4 times the second difference between the maximum depth of the middle sipe and the groove depth of the middle raised portion.

2. The heavy duty tire according to claim 1, wherein, in each of the plurality of lateral grooves, a length of the raised portion in the tire axial direction is less than a length of the lateral groove in the tire axial direction.

3. The heavy duty tire according to claim 2, wherein, in each of the plurality of lateral grooves, the length of the raised portion in the tire axial direction is 0.4 to 0.6 times the length of the lateral groove in the tire axial direction.

4. The heavy duty tire according to claim 1, wherein, in each of the plurality of lateral grooves, a groove depth at the raised portion is 0.5 to 0.8 times a groove depth of each circumferential groove to which the lateral groove is connected.

5. The heavy duty tire according to claim 1, wherein a depth of each three-dimensional sipe is 0.5 to 0.8 times a groove depth of each circumferential groove to which the three-dimensional sipe is connected.

6. The heavy duty tire according to claim 1,
wherein each of the plurality of lateral grooves comprises a pair of groove walls, and a pair of groove edges located at positions at which the pair of groove walls and a tread surface of the hexagonal blocks intersect each other, and
wherein each of the pair of groove walls is inclined at an angle from 3° to 8° relative to a normal line passing through a corresponding one of the pair of groove edges so as to be normal to the tread surface.

7. The heavy duty tire according to claim 1, wherein each of the plurality of lateral grooves has a groove width of 7 to 9 mm.

8. The heavy duty tire according to claim 1, wherein, in a pair of the lateral groove and the hexagonal block which are adjacent to each other in the tire circumferential direction, a groove depth at the raised portion formed in the lateral groove is less than a depth of the three-dimensional sipe formed in the hexagonal block.

9. The heavy duty tire according to claim 1, wherein a maximum groove depth of the crown lateral groove is equal to a maximum groove depth of the middle lateral groove.

10. The heavy duty tire according to claim 1, wherein each of the lateral grooves extends from one of the circumferential grooves to another of the circumferential grooves.

11. The heavy duty tire according to claim 1,
wherein the lateral grooves are linear and extend at first acute angle relative to the tire axial direction, and
wherein the three-dimensional sipes extend at a second acute angle relative to the tire axial direction.

12. The heavy duty tire according to claim 1, wherein, for each of the hexagonal blocks, a maximum width in the tire axial direction is less than a maximum length in the tire circumferential direction.

13. The heavy duty tire according to claim 12, wherein a ratio of the maximum width to the maximum length is from 0.75 to 0.90 inclusive.

14. The heavy duty tire according to claim 1,
wherein the plurality of circumferential grooves include a plurality of shoulder circumferential grooves and a plurality of crown circumferential grooves, and
wherein a first maximum width of the shoulder circumferential grooves is greater than a second maximum width of the crown circumferential grooves.

15. The heavy duty tire according to claim 1, wherein the raised portion has sloped opposite sidewalls in a sectional view.

16. The heavy duty tire according to claim 1, wherein the maximum depth of the middle sipe is greater than or equal to 1.15 times to 1.25 times the maximum depth of the crown sipe.

17. A heavy duty tire comprising:
a tread portion,
wherein the tread portion includes:
a plurality of circumferential grooves zigzagging in a tire circumferential direction so as to form zigzag vertexes,
a plurality of lateral grooves connecting between the zigzag vertexes of the circumferential grooves adjacent to each other in a tire axial direction, and
a plurality of hexagonal blocks formed by the circumferential grooves adjacent to each other in the tire axial direction and the plurality of lateral grooves,
wherein the plurality of circumferential grooves each have a groove depth of 21 mm or more,
wherein each of the plurality of hexagonal blocks comprises a three-dimensional sipe zigzagging in the tire axial direction and a tire radial direction and extending across the corresponding hexagonal block,
wherein each of the plurality of lateral grooves comprises a raised portion formed by raising a groove bottom of the corresponding lateral groove to connect between the hexagonal blocks adjacent to each other in the tire circumferential direction,
wherein, in each of the plurality of lateral grooves, a length of the raised portion in the tire axial direction is less than a length of the lateral groove in the tire axial direction,
wherein, in each of the plurality of lateral grooves, the length of the raised portion in the tire axial direction is 0.4 to 0.6 times the length of the lateral groove in the tire axial direction,
wherein, in each of the plurality of lateral grooves, a groove depth at the raised portion is 0.5 to 0.8 times a groove depth of each circumferential groove to which the lateral groove is connected,
wherein a depth of each three-dimensional sipe is 0.5 to 0.8 times a groove depth of each circumferential groove to which the three-dimensional sipe is connected,
wherein each of the plurality of lateral grooves comprises a pair of groove walls, and a pair of groove edges located at positions at which the pair of groove walls and a tread surface of the hexagonal blocks intersect each other,
wherein each of the pair of groove walls is inclined at an angle from 3° to 8° relative to a normal line passing through a corresponding one of the pair of groove edges so as to be normal to the tread surface,
wherein each of the plurality of lateral grooves has a groove width of 7 to 9 mm,
wherein the plurality of circumferential grooves comprises a pair of crown circumferential grooves, and a pair of shoulder circumferential grooves disposed outwardly of the pair of crown circumferential grooves in the tire axial direction,
wherein the plurality of lateral grooves comprises a plurality of crown lateral grooves connecting between the pair of crown circumferential grooves, and a plurality of middle lateral grooves each connecting between the crown circumferential groove and the shoulder circumferential groove which are adjacent to each other in the tire axial direction,
wherein the raised portion comprises a crown raised portion and a middle raised portion formed in each crown lateral groove and each middle lateral groove, respectively,
wherein a groove depth at the crown raised portion is equal to a groove depth at the middle raised portion,
wherein the hexagonal blocks comprise a plurality of crown blocks formed between the pair of crown circumferential grooves, and a plurality of middle blocks formed between the crown circumferential groove and the shoulder circumferential groove which are adjacent to each other in the tire axial direction,
wherein the three-dimensional sipes comprise a crown sipe disposed in each of the plurality of crown blocks, and a middle sipe disposed in each of the plurality of middle blocks,
wherein a maximum depth of the middle sipe is greater than a maximum depth of the crown sipe,
wherein a first difference between the maximum depth of the crown sipe and the groove depth of the crown raised portion is less than a second difference between the maximum depth of the middle sipe and the groove depth of the middle raised portion, and
wherein the first difference between the maximum depth of the crown sipe and the groove depth of the crown raised portion is 0.3 to 0.4 times the second difference between the maximum depth of the middle sipe and the groove depth of the middle raised portion.

18. The heavy duty tire according to claim 17,
wherein the lateral grooves are linear and extend at first acute angle relative to the tire axial direction, and
wherein the three-dimensional sipes extend at a second acute angle relative to the tire axial direction.

* * * * *